Patented May 15, 1923.

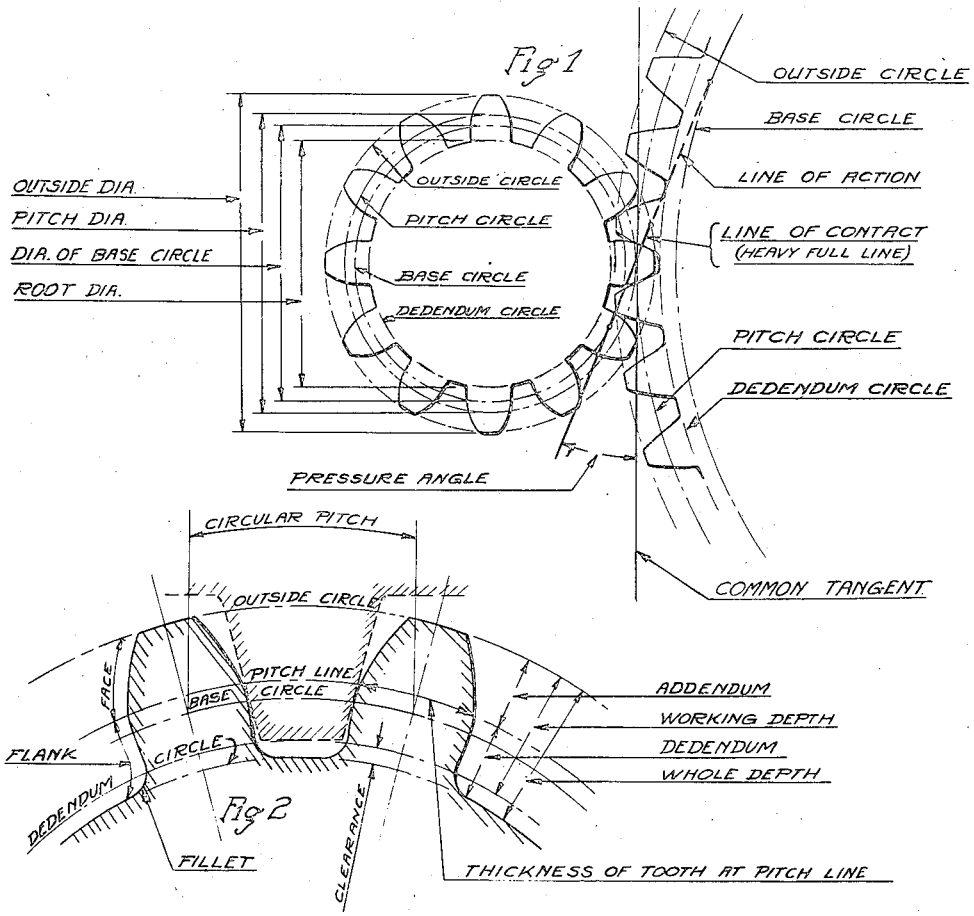

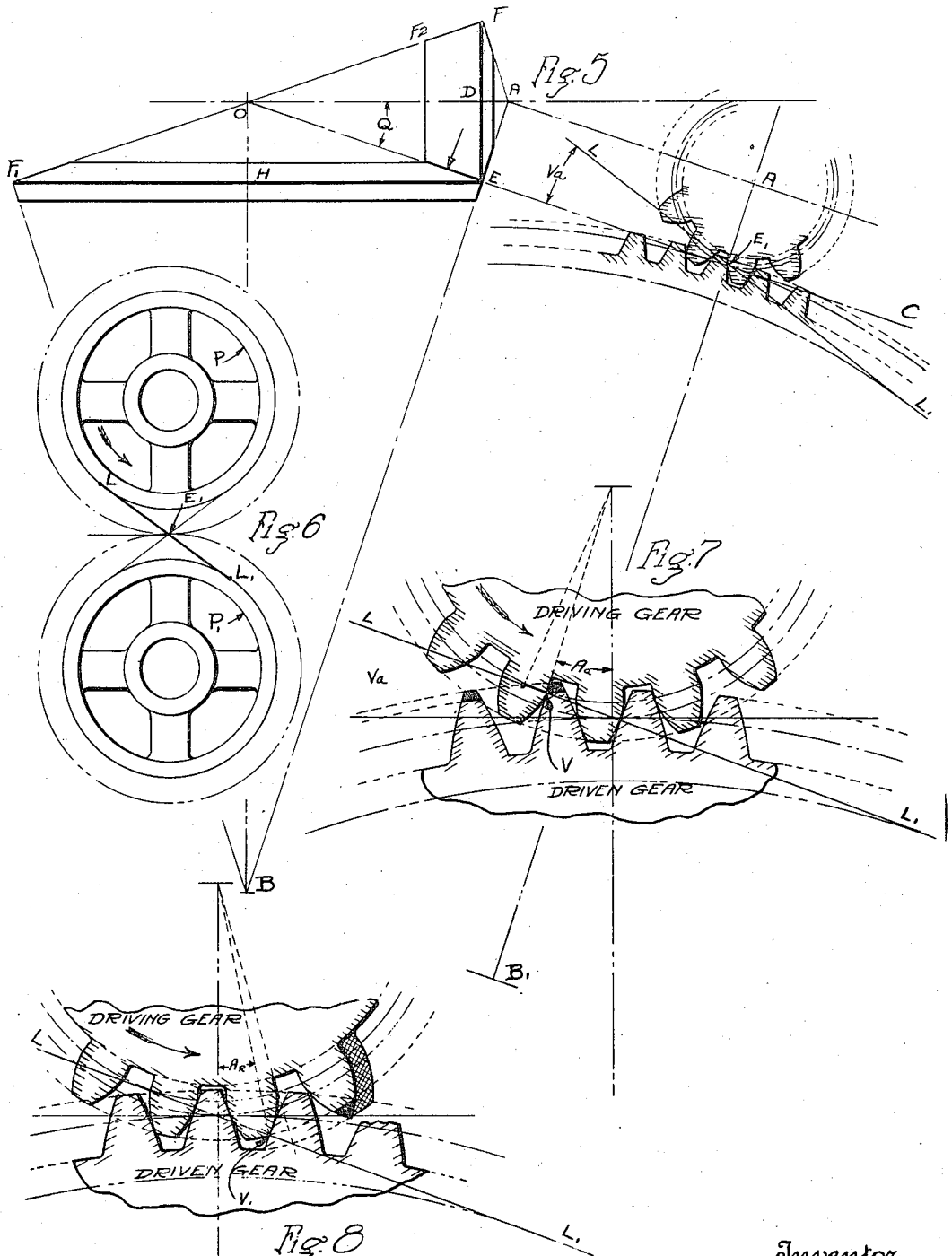

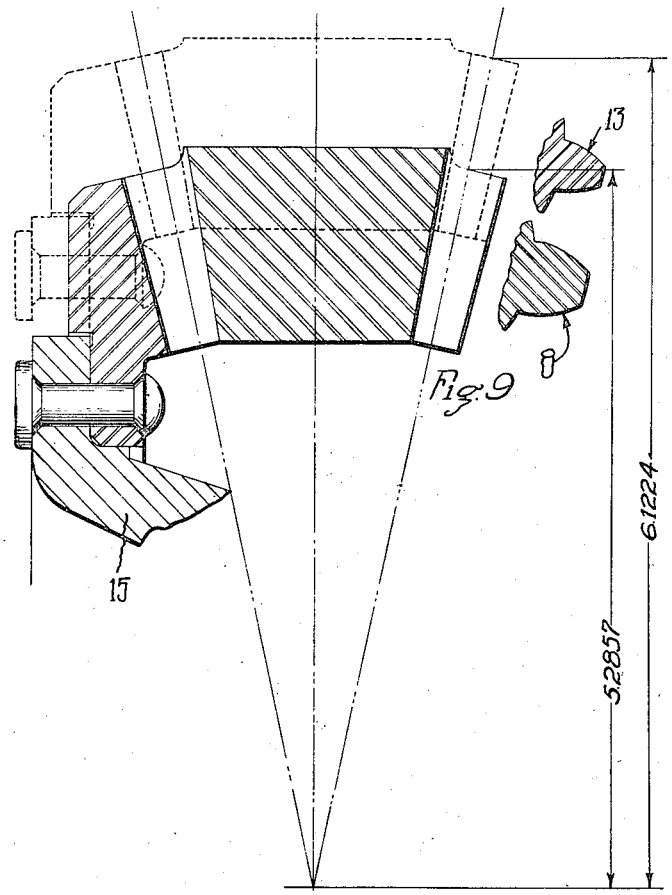
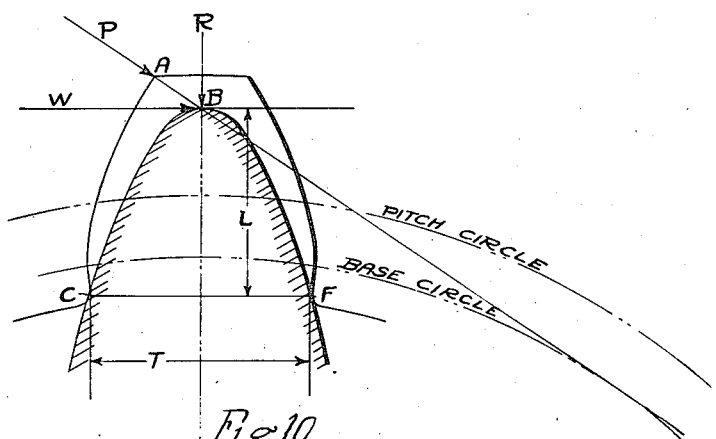

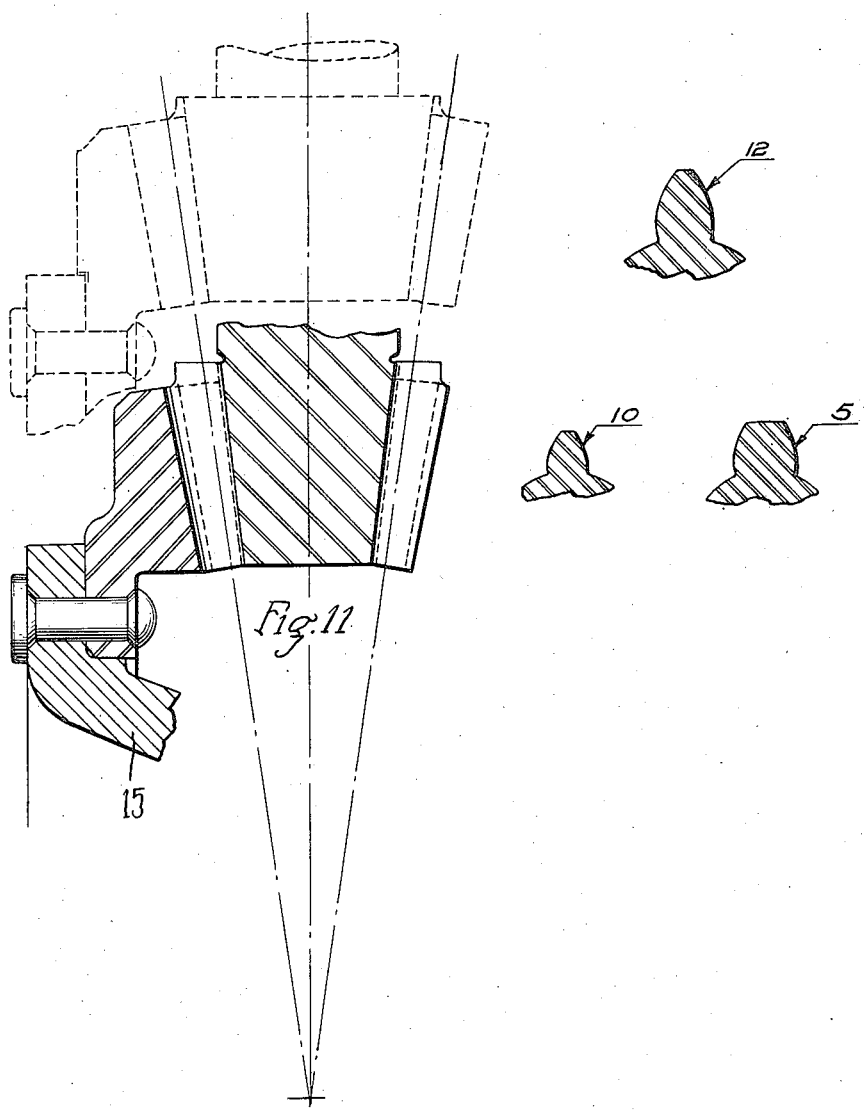

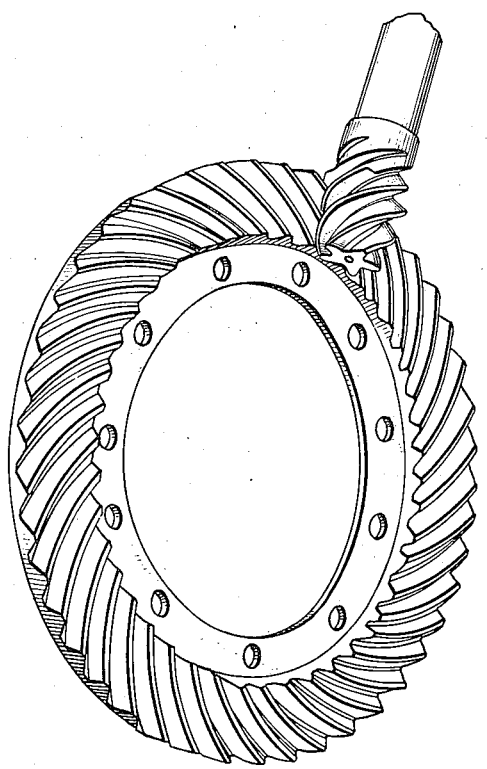

1,455,706

UNITED STATES PATENT OFFICE.

FERDINAND A. BOWER AND BENTON CATALINE, OF FLINT, MICHIGAN, ASSIGNORS TO GENERAL MOTORS CORPORATION, OF DETROIT, MICHIGAN, A CORPORATION OF DELAWARE.

COARSE-PITCH SPIRAL-BEVEL GEAR.

Application filed October 23, 1919. Serial No. 332,798.

*To all whom it may concern:*

Be it known that we, FERDINAND A. BOWER and BENTON CATALINE, citizens of the United States, and residents of Flint, county of Genesee, and State of Michigan, have invented certain new and useful Improvements in Coarse-Pitch Spiral-Bevel Gears, of which the following is a full, clear, concise, and exact description, such as will enable others skilled in the art to which the invention relates to make and use the same, reference being made therein to the accompanying drawings, which form a part of this specification.

The invention relates to bevel gears of the curved involute type, more especially to those of the spiral type such as are used for the final drive for automobiles, trucks, tractors and other self-propelled vehicles and apparatus.

As a matter of common knowledge the speed in a motor vehicle having a given wheel diameter is determined by three factors, (1st), the number of revolutions of the crank shaft of the engine, (2nd), the reduction in the change speed gearing within the transmission casing, and, (3rd), the reduction in the final drive, that is, between the transmission and the axle. Moreover, good practice demands that the increments between the several speed relations in the change speed gearing be not excessive, in order to secure smoothness of action, and also that the number of such increments be small, ordinarily not over three, to permit ease of driving. With these limitations in the type and construction of change speed gearing (in the gear box) and with the increasing tendency to the use of high speed engines, it will be readily understood that the additional speed reduction has of necessity been effected in the final drive—by way of worm gearing, jack-shaft or special axle constructions for the higher reductions necessitated in trucks and tractors, and through the medium of larger bevel gear sets in the case of automobiles. In the latter instance with the ordinary types of bevel gears, the minimum road clearance has entered as the limiting condition to such an extent as to render it impossible to attain the higher speed reductions, and those of greater than about 4:1 were obtainable only on making the ring gear and associated axle housing of large diameter.

The leading object of the invention is to make it possible to vary the speed reduction, effected by a bevel pinion driving the ring gear of the differential in the usual manner, to a greater extent than has been possible heretofore, particularly in so far as the attainment of high gear ratios is concerned, and at the same time to maintain an efficient and quiet transmission of power. From this it follows that for a given road clearance and torque, with gears made according to the invention, it is possible to obtain a greater reduction than was possible according to prior practice throughout the industry; stated otherwise, with a given reduction and motor torque, the invention renders available a smaller ring gear diameter and consequently a greater road clearance than was possible according to prior practice. It also provides a stronger and more efficient spiral bevel gear set for a given space and speed reduction than available heretofore.

Prior to this invention the practice was to employ not less than ten (and usually eleven or more) teeth in the pinion of the set, this being regarded as the irreducible minimum that would give proper tooth action and run without interference. In the event it was desired to increase the speed reduction in the gear set, it was necessary, therefore, to increase the diameter of the ring gear in order that the strength and efficiency of the set be maintained. This increase in ring gear diameter required a corresponding increase in size of the axle housing, adding to weight and reducing the road clearance, the practical result being that maintenance of road clearance and increase of gear reduction was obtained only by sacrificing strength and efficiency;—in fact the desirable higher reductions could not be secured in the bevel gear set at all.

For example:—With a factor of safety of 1.6 it was impossible under prior practice to obtain a greater reduction than about $4\frac{1}{2}$ to 1 with a given motor torque of 1740 inch pounds, a gear box reduction of $3\frac{1}{3}$ to 1, an allowable fiber stress of 100,000 pounds per square inch (used for carbonized $3\frac{1}{2}$% nickel steel), and a ring gear diameter of 10.6".

In accordance with the invention, by reducing the number of teeth in the pinion below ten and especially to eight or less and by properly determining the shape thereof, particularly in the matter of spiral angle, involute angle, addendum, dedendum and thickness of tooth, we are enabled to produce a gear set suitable for the final drive of motor vehicles which will give a greater speed reduction than has been attainable heretofore; or stating a specific case for purposes of direct comparison, the invention renders feasible a speed reduction of 6.8 to 1 or greater, with an increase in the factor of safety to at least 1.9, under the same conditions of motor torque, ring gear diameter, gear box low speed reduction and fiber stress as obtained in the example of prior practice referred to in the preceding paragraph. In general, it provides gear sets suitable for motor vehicle service wherein a speed reduction 8:1 or greater is easily attained.

Another object is to provide a type of gear set that permits a greater variation in the ratio of speed reduction without shifting centers of the corresponding bearings than has been possible heretofore; in this respect, the pinion more nearly assumes the attributes of a worm, thereby making it possible to position any one of several gear sets of different speed reductions in a standard axle housing.

To facilitate an understanding of the invention, it will be necessary to identify the various elements involved.

Figure 1 shows a pinion and a portion of its mating gear. This figure is self-explanatory. Fig. 2 is supplementary to Fig. 1, and shows the elements of the teeth which are not included in Fig. 1. Fig. 3 shows the construction of the involute curve used for the working surface of the tooth, this being the path described by a point in a straight line which rolls along a fixed circle termed the "base" circle. Fig. 4 shows a portion of a spiral bevel gear as it would appear when looking in the direction indicated by the arrow in Fig. 5. Fig. 5 represents the pitch cones of a pair of bevel gears. Fig. 6 illustrates the line of action of two mating bevel gears. Figs. 7 and 8 illustrate respectively the angle of approach and recess. Figs. 9 and 11 show in dashed lines and in full lines comparative designs respectively under the prior practice and in accordance with the present invention. Fig. 10 is a stress diagram of a gear tooth. Fig. 12 is a perspective view, reproduced from a photograph of a gear set constructed in accordance with the invention and intended for the final drive of a five-ton truck.

The line $o$—$e$ in Fig. 4 is the pitch cone distance. $o$—$e^1$ is the distance along the pitch cone from the apex to the inner end of the teeth. The line X—Y is tangent to the curved tooth at its center. The spiral angle $Sa$ is the inclination of the line X—Y with an element of the pitch cone which passes through the point of tangency. The virtual section is a view of the tooth taken along an element of the pitch cone. The normal section is a view taken along a line parallel to the tangent line X—Y. The normal angle $Na$ is the same as the pressure angle of the cutter. The relation of the virtual pressure angle $Va$ to the normal pressure angle $Na$ is given by the equation:—

Tan. $Va$ equals tan $Na$ times sec. $Sa$.

Where $Va$ equals virtual pressure angle, $Na$ equals normal pressure angle, $Sa$ equals spiral angle.

In Fig. 5 OE is the pitch cone distance; DE is the pitch radius of the pinion; AE is the virtual pitch radius of the pinion and is also the slant height of the normal cone of the pinion; HE is the pitch radius of the ring gear; BE is the virtual pitch radius of the ring gear and is also the slant height of the normal cone of the ring; Q is the pitch cone angle of the pinion; AEF is the normal cone of the pinion; and BEF' is the normal cone of the ring.

If we assume the curved surface of each of the normal cones to be cut along one of the elements, namely AF and BF$^1$, in the present case, and spread out on a plane, we will have portions of two circles whose radii are the slant heights of the normal cones. If now these circles be taken as pitch circles placed tangent to the line OE produced, and teeth constructed on them by any of the usual methods for spur wheels, we may then wrap these surfaces with the teeth, back into their regular shape; and using the tooth curves as they appear on the normal cones as directrices, we may generate the required tooth surfaces. In constructing involute teeth, we must determine the line of action L—L$^1$. This line is drawn through the intersection of the line of centers A$^1$ B$^1$ with the common tangent EC, making an angle with said common tangent equal to the virtual pressure angle $Va$. With A$^1$ and B$^1$ as centers, the base circles may be drawn tangent to the line of action L—L$^1$. On these base circles the involutes which determine the acting surfaces of the teeth are constructed.

Fig. 6 as stated heretofore more fully illustrates the line of action of two mating involute gears. Two pulleys P and P$^1$, whose circumferences are the same as the circumferences of the base circles of a pair of gears, are joined by a crossed belt. The line L—L$^1$ which is tangent to the surfaces of the two pulleys, represents the line of action of two involute gears whose pitch circles are tangent to each other at the point E$^1$, where the line L—L$^1$ crosses the line of centers. Assuming that pulley P is turning as indicated by the arrow, then the action is from L to L¹, L—E¹ being approach and E¹—L¹ recess.

In Fig. 7 the angle of approach A$a$ is determined by the point V where the addendum or outside circle of the driven gear intersects the line of action L—L¹; this being the point where the driving gear tooth first makes contact with the driven gear tooth. In Fig. 8 the angle of recess is determined by the point V¹ where the addendum or outside circle of the driving gear intersects the line of action L—L¹, this being the point where the driving gear tooth ceases to contact the driven gear tooth.

The fewer teeth we have in a gear of a given pitch circle, the greater is the angle between teeth. From this we see that we must have as large an arc of contact as possible. To increase the arc of action, we must increase the angle of approach (A$a$ Fig. 7) or the angle of recess (A$r$ Fig. 8) or both. The maximum angle of approach is limited to the virtual pressure angle. In Fig. 7 the addendum circle of the driven gear intersects the line of action L—L¹ at its point of tangency V with the base circle of the driving gear. Outside of this point there can be no proper action, therefore an increase in the addendum, as shown by black portion, would cause an interference with the flank of the driving gear tooth. To avoid this interference, it would require under cutting the teeth of the driving gear thus making a weak tooth. Therefore, to increase the angle of approach we must increase the virtual pressure angle, which is accomplished by either increasing the normal pressure angle, or the spiral angle. To increase the arc of action by increasing the angle of recess, we must increase the outside or addendum circle of the driving gear. In gears of a fine pitch, this increase is limited by the fact that the teeth very soon become narrow at the end, as shown by the black portion in Fig. 8, and consequently very weak and subject to being chipped or broken off. However, with a coarser pitch, which would mean fewer teeth in the driving gear if we retain the same pitch radius or approximately so, we obtain a thicker tooth as shown by the shaded portion in Fig. 8, and this increased thickness of tooth allows us to increase the angle of recess by increasing the addendum.

Our discovery, which is opposed to the previously accepted doctrines of gear construction, as stated before has to do with the heretofore unexplored and supposedly impossible field wherein a bevel pinion of the spiral or curved involute type has less than ten teeth, especially from three to eight, wherein the speed reduction is relatively high; wherein the pitch diameter of the ring gear must be sufficiently small to give a practical road clearance; and wherein quiet running, efficient transmission of power and long life under extremely heavy service, is necessary.

In this field we find that with the angle of obliquity or pressure angle of substantially 14½ degrees or more, a spiral angle sufficiently great to cause continuous driving action and with the teeth correctly proportioned in accordance with the invention, a tooth action and interchange of forces takes place in which the gears will stand up and prove satisfactory in efficiently transmitting the power for a period equal to, or greater, than the ordinary life of such parts.

It is characteristic of the invention that for given conditions in regard to pitch diameter, speed ratio and power transmitted, a large increase in the factor of safety is thereby made possible without sacrificing quietness of action or other desirable attributes obtained in spiral bevel gears as heretofore constructed.

The results thus attained are partly due to the fact that the increased cross-section of the teeth, Figs. 8, 9, and 11, permit a much deeper case hardening, a condition which will be understood by remembering that it was necessary under prior practice to reserve as much of the tooth as possible in the form of tough fibrous metal in order to insure the transmission of shocks, whereas in the present gears there is ample body metal even when case hardened to a greatly increased degree. This not only provides a more fully carbonized and consequently harder outer surface but also a more fibrous core.

These gears lend themselves to a new method of layout which possesses important advantages over prior practice. In laying out bevel gears of the spiral or curved involute type we prefer to consider each case by itself instead of following a set formula. In order to bring the idea of the invention more clearly to view, we herewith give a general description of our method of laying out gears.

In the design of bevel gears for motor vehicles, especially in automobiles, there are several conditions which must be maintained within practical limits, namely, 1st, gear ratio; 2nd, ground clearance; 3rd, motor torque; and 4th, gear box reduction.

The gear ratio determines the pitch cone angle. The road clearance, taking into consideration necessary space for housing and gear clearance, determines the pitch diameter of the ring gear. The motor torque combined with the gear box reduction gives us the torque to be transmitted by the gears.

With these points established, we must next determine what pitch should be used. Generally this can be very closely determined from experience. Another way to determine the pitch, would be to assume a certain number of teeth in the pinion; multiplying the number of teeth in the pinion by the gear ratio, gives the number of teeth in the ring gear. Dividing the number of teeth in the ring gear by its pitch diameter gives the diametral pitch. In assuming a number of teeth for the pinion, the following table may be followed:

For gear ratios from $4\frac{1}{4}:1$ to $4\frac{5}{8}:1$ use 9 teeth.

For gear ratios from $4\frac{5}{8}:1$ to $4\frac{7}{8}:1$ use 8 teeth.

For gear ratios from $4\frac{7}{8}:1$ to $5\frac{1}{8}:1$ use 7 teeth.

For gear ratios from $5\frac{1}{8}:1$ to $6:1$ use 6 teeth.

For gear ratios from $6:1$ and up use 5 teeth (or less).

This table is tentative only, and not to be considered restrictive in any way.

With the number of teeth and pitch established, we now proceed to lay out the teeth on the virtual pitch circles as illustrated in Fig. 5. In determining the virtual pressure angle $Va$, we prefer to use a normal pressure angle of 20 degrees or more. The spiral angle $Sa$ in Fig. 4 should be sufficient to cause at least two teeth to be in constant mesh as illustrated in Fig. 4. Here it may be seen that the small end of one tooth has passed the line $o$—$e$ before the large end of the preceding tooth has left it, or that there is overlapping contact.

The addendum of the ring gear can now be determined. We prefer to make the angle of approach $Aa$, equal or substantially equal to the virtual pressure angle $Va$, which is obtained from the normal pressure angle by the formula heretofore indicated. As explained previously, this determines the addendum or outside diameter of the ring gear.

The bottom clearance is the distance from the point of a tooth to the bottom of the space in the mating gear. This clearance varies somewhat according to the method of cutting the teeth. A good average is to make the clearance about .006 times the pitch cone distance.

By laying out the teeth to a scale several times actual size, we can proportion them in regard to thickness of tooth on pitch circle, addendum and dedendum so that the teeth of the ring and pinion are of equal, or approximately equal strength.

To determine the comparative strength of the gear teeth, we prefer to use the well known graphical method of Wilfred Lewis, and apply it to the virtual section taken midway between the ends of the teeth. This method, as illustrated in Fig. 10, is based on the assumption that all of the load P on the tooth is concentrated at the end of the tooth, and that force P is always normal to the involute, or tangent to the base circle. The actual force is resolved into a radial force R and a tangential force W. The radial force R produces a uniformly distributed compressive stress, and the tangential force W produces a bending stress in the tooth.

In order to determine the weakest section of the tooth, we construct a parabola with its vertex at B, and tangent to the profile of the tooth at C and F, which is the weakest section of the tooth. Now considering the parabola as a beam of equal strength throughout its length, we have the formula W equals $$\frac{SAT^2}{6L}$$

where
W equals the load in pounds.
S equals fiber stress in pounds per square inch.
A equals length of tooth face (see F—F² in Fig. 5).
T equals width of parabola at its point of tangency to the tooth outline.
L equals the distance from the vertex of the parabola to the point of tangency of parabola to tooth outline.

For the actual load on the tooth, we multiply the motor torque by the gear box reduction at low speed and divide by the mean pitch radius of the pinion. This load divided into the load determined from the formula W equals $$\frac{SAT^2}{6L}$$

gives the factor of safety. If this factor of safety is less than that adopted as a standard, say 1.6, a tooth is removed from the pinion and the gear set redesigned. By a comparison of two or more such layouts, it is possible to determine the best combination of teeth for each particular job.

Fig. 9 shows a comparison of two gear sets having approximately the same ratio. The gear set shown by dotted lines has 13 teeth in the pinion and 60 teeth in the ring gear with a diametral pitch of 4.9″. These teeth were cut according to conventional standards of prior practice, (see table A). The factor of safety of this pinion tooth, determined from the mean virtual section 13, according to the previous explained method, is 1.82. The gear set shown by full lines has 8 teeth in the pinion and 37 teeth in the ring gear with a diametral pitch of 3.5. These teeth were designed in accordance with the invention, (see table B). The factor of safety for this pinion tooth, determined from the mean virtual section 8, is 2.6.

This comparison is taken from actual conditions having a motor torque of 1740 inch pounds and gear box reduction of $3\frac{1}{4}:1$. The results show that we have increased the factor of safety from 1.82 to 2.6 and reduced the pitch diameter of the ring gear by approximately 1⅝", thus obtaining an important saving in material, both in the gears and the housing, greatly reducing the cost of cutting the gears, and adding materially to the road clearance. The gear set made in accordance with the invention gave satisfactory results under conditions which were considered too severe for the other set referred to in the example.

Fig. 11 shows a gear ratio of 6.8:1 with a gear ring pitch diameter of approximately 10.6", transmitting a motor torque of 1740 inch pounds with a gear box reduction of 3⅓:1. The dotted lines show the teeth when made in accordance with conventional standards of prior practice; the pinion having ten teeth and the ring gear 68 teeth, it being understood that the former turns about a fixed axis and that the latter is either separate from or integral with the differential housing element 15. The diametral pitch is 6.42. The dimensions for the teeth are given in table C. The factor of safety for the pinion tooth determined from the mean virtual section 10, is less than unity. The applied load is 8544 pounds and the safe load is 6788 pounds. The full lines show the teeth when made in accordance with the invention. The pinion has 5 teeth and the ring gear 34 teeth. The diametral pitch is 3.21. The dimensions for the teeth are given in table D. The factor of safety for this pinion tooth determined from the mean virtual section 5, is 1.9. In order to maintain a factor of safety of 1.6 in the pinion tooth in the above example and have ten teeth in the pinion, it will be necessary to use 4.7 diametral pitch, which gives a ring gear pitch diameter of 14.47". This is shown in dotted lines. Dimensions are given in table E. This is an increase of approximately 3⅞" over the pitch diameter of the ring gear of the set designed in accordance with the invention, and such an increase would reduce the road clearance to a point where it would be impractical, and would add greatly to the cost, both in labor and in material.

Fig. 12 is a perspective view reproduced from a photograph of a gear set constructed in accordance with the invention and intended for the final drive of a five-ton truck. The ring gear diameter is approximately 18"; the pinion diameter approximately 2.05", the number of teeth in the pinion, 5, and in the gear, 44, giving a speed reduction of 8.8:1. The marked departure of the invention from prior practice and the similarity of the pinion to a worm is clearly shown.

While our invention, as indicated heretofore, is especially concerned with spiral bevel gear sets for this purpose wherein the number of teeth in the pinion is eight or less, we nevertheless regard those made with nine teeth as within its scope; and while it is of especial value in connection with speed reductions of 4½:1 or greater, it possesses great merit as applied to the smaller reductions, say 3½:1, since it results in a saving both in material and labor.

The following are the tables giving the dimensions in the special cases referred to above:

| Tables | A | B | C | D | E |
|---|---|---|---|---|---|
| No. teeth in ring | 60 | 37 | 68 | 34 | 68 |
| No. teeth in pinion | 13 | 8 | 10 | 5 | 10 |
| Pitch | 4.9 | 3.5 | 6.42 | 3.21 | 4.7 |
| Pitch diameter of ring | 12.2449" | 10.5714" | 10.592" | 10.592" | 14.468" |
| Pitch diameter of pinion | 2.6531" | 2.2857" | 1.558" | 1.558" | 2.1276" |
| Pitch cone distance | 6.2644" | 5.4079" | 5.353" | 5.353" | 7.3119" |
| Length of tooth face | 1.375" | 1.375" | 1.375" | 1.375" | 1.375" |
| Thickness of ring tooth on pitch circle | .2825" | .2192" | .155" | .4152" | .2117" |
| Thickness of pinion tooth on pitch circle | .3586" | .5784" | .3343" | .5635" | .4567" |
| Addendum of ring tooth | .1186" | .1341" | .09" | .1096" | .0974" |
| Addendum of pinion tooth | .204" | .2857" | .204" | .2731" | .3068" |
| Dedendum of ring tooth | .2457" | .3440" | .236" | .3052" | .3508" |
| Dedendum of pinion tooth | .1603" | .1924" | .122" | .1417" | .1412" |
| Chordal thickness of pinion tooth | .3575" | .5725" | .3328" | .5513" | .4535" |
| Mean chordal thickness of pinion tooth | .3200" | .503" | .2901" | .4806" | .4100" |
| Mean addendum of pinion tooth | .1826" | .251" | .178" | .238" | .273" |
| Mean dedendum of pinion tooth | .1435" | .169" | .1063" | .1235" | .128" |
| Virtual pitch radius of pinion | 1.3573" | 1.1692" | .7873" | .7873" | 1.0752" |
| Mean virtual pitch radius of pinion | 1.2151" | 1.2073" | .6862" | .6862" | .9741" |
| Mean pitch radius of pinion | 1.188" | 1.004" | .679" | .679" | .9638" |
| Normal pressure angle | 20 deg. | 20 deg. | 20 deg. | 20 deg. | 20 deg. |
| Spiral angle | 30 deg. | 31 deg. | 23 deg. | 35½ deg. | 25 deg. |
| L | .264" | .324" | .24" | .25" | .37" |
| T | .328" | .476" | .284" | .42" | .394" |

We claim:—

1. A curved tooth bevel gear set comprising a driving pinion having less than 10 teeth and a driven gear continuously meshing therewith, capable of transmitting the driving torque of a motor vehicle when properly constrained to resist motion with respect to each other in other than a circular direction.

2. A curved tooth bevel gear set adapted to transmit the driving torque of a motor vehicle, the driving pinion of said set having less than ten teeth and the length of the teeth of the set, measured longitudinally of the corresponding toothed member, and the spiral angle of said teeth being such as to maintain action of at least two teeth of the pinion at all times, and said gear set giving a speed reduction of upwards of 4¼:1.

3. A spiral bevel gear set through which the driving torque of a motor vehicle is transmitted, the teeth of the driving pinion being less than ten in number, whereby teeth of greater length, measured radially of said pinion, and of greater thickness, measured circumferentially of said pinion, than in the case of standard practice may be employed.

4. A motor vehicle comprising a differential housing element having rigid therewith a ring gear, a driving pinion of from 3 to 9 teeth meshing with the teeth of the ring gear and rotatable about a fixed axis, the teeth of the ring gear and pinion being of the spiral type and the spiral angle being such that there is continuous action between the teeth of the ring gear and pinion, whereby the higher speed reductions may be secured and equal or substantially equal ring gear diameter, and factor of safety be maintained.

In testimony whereof we affix our signatures.

FERDINAND A. BOWER.
BENTON CATALINE.